United States Patent [19]

Perkins

[11] 4,015,878
[45] Apr. 5, 1977

[54] CHAIR CONSTRUCTION FOR LONG USE COMFORT

[76] Inventor: Charles M. Perkins, R.F.D. No. 2, Albion, Ill. 62806

[22] Filed: Jan. 16, 1976

[21] Appl. No.: 649,719

[52] U.S. Cl. .............................. 297/385; 297/357
[51] Int. Cl.² ........................................ A62B 35/00
[58] Field of Search .......... 297/357, 410, 345, 385, 297/353, DIG. 10, 384

[56] References Cited

UNITED STATES PATENTS

| 282,737 | 8/1883 | Liscomb | 297/358 |
|---|---|---|---|
| 360,855 | 4/1887 | Cooper | 297/358 X |
| 570,208 | 10/1896 | Harry | 297/358 |
| 638,534 | 12/1899 | Welch | 297/410 X |
| 1,786,663 | 12/1930 | Leek | 297/385 X |
| 2,572,149 | 10/1951 | Hind et al. | 297/DIG. 10 |
| 2,603,275 | 7/1952 | Kuebler | 297/357 X |
| 3,787,089 | 1/1974 | Werthander | 297/DIG. 10 |
| 3,807,795 | 4/1974 | Weant | 297/DIG. 10 |

Primary Examiner—James T. McCall
Attorney, Agent, or Firm—Robert K. Youtie

[57] ABSTRACT

A chair construction including lower and upper back parts, wherein the latter is selectively positionable vertically relative to the former and carries a torso girding belt, thereby enabling a user's torso to be elevated at least partially from the seat for increased comfort during long usage.

8 Claims, 4 Drawing Figures

CHAIR CONSTRUCTION FOR LONG USE COMFORT

BACKGROUND OF THE INVENTION

While the field of chair construction is extremely highly developed, and there have been proposed a variety of chairs for adjustably positioning the person of the occupant, these prior structures have not found general acceptance as being extremely specialized and limited in application, complex and expensive in structure, difficult and awkward to operate, and expensive and readily subject to malfunction.

SUMMARY OF THE INVENTION

It is, therefore, an important object of the present invention to provide a chair construction which is capable of greatly enhancing the user's comfort through periods of extremely long usage, say for long distance truck drivers and other persons required to sit for long periods.

It is a further object of the present invention to provide a chair construction of the type described which is extremely simple in structure for durability and reliability throughout a long, useful life, capable of economic manufacture for sale at a reasonable price, and which can be conveniently operated by the occupant during use and without removal from the chair.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
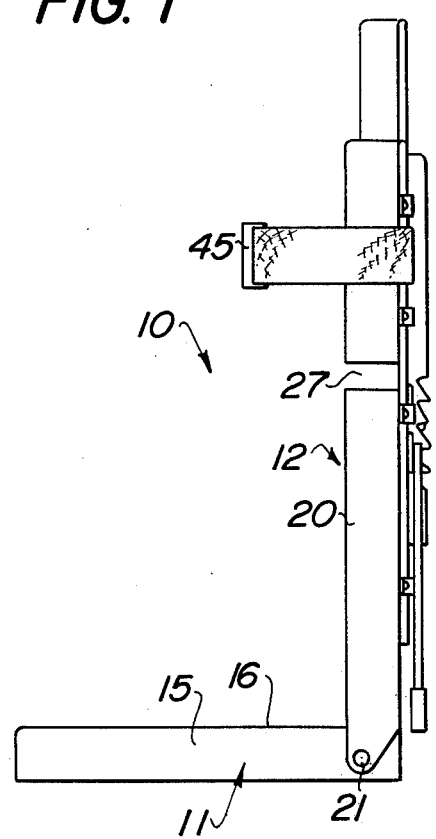
FIG. 1 is a side elevational view showing a chair constructed in accordance with the teachings of the present invention.
Figure 2:
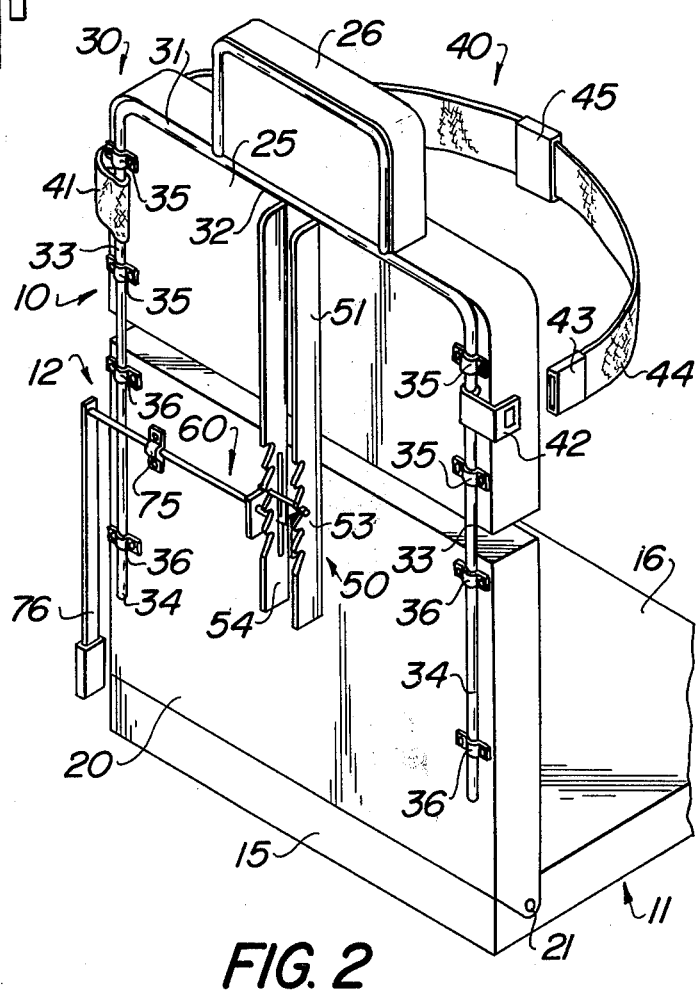
FIG. 2 is a rear perspective view showing the chair of FIG. 1.

Referring now more particularly to the drawings, and specifically to FIGS. 1 and 2 thereof, a chair construction of the present invention is there generally designated 10, including a seat 11 and back 12. While the chair 10 is illustrated herein and will be described without reference to specific environment, it is understood that the teachings of the present invention may be advantageously emmployed in a wide variety of applications. For example, as a driver's seat in private motor vehicles, passenger buses, long distance trucks, airplanes, and other vehicles, as well as passenger seating. Such examples are by way of illustration and without limiting intent, the description and claims herein being intended to cover all suitable applications, without limitation.

The seat 11 may be essentially conventional, comprising a generally horizontal seat body 15 having an upwardly facing surface 16 for supporting engagement with an occupant-user's buttocks to sustain the gravitational load of the user's person.

The seat back 12 includes a lower back part or lower back rest 20 which may upstand from a rearward region of the seat body 15, being secured thereto by any suitable means, such as generally horizontal, laterally extending pivot means 21. That is, the lower back rest or part 20 may be of generally rectangular outline configuration, as seen in FIG. 2, generally laterally coextensive with the seat body 15 and upstanding therefrom.

Located above and preferably directly over the lower back rest or part 20, the seat back 12 may include an upper back rest or part 25, which may as illustrated herein be coextensive with the lower back rest in horizontal dimensions, both laterally and forwardly and rearwardly. That is, the upper back rest or part 25 may be of a flat, vertically disposed configuration, generally rectangular in the vertical plane, and superposed essentially congruently over the lower back rest or part 20. If desired, a head part or head rest 26 may be carried on the upper side of upper back part 25, vertically extensile and retractile with respect thereto, as desired.

Figure 4:
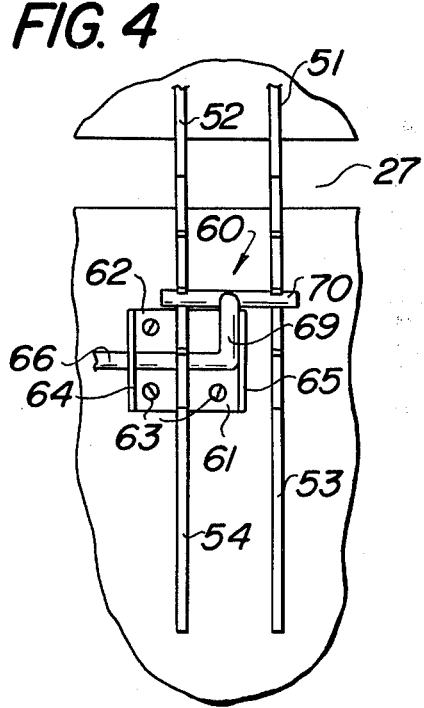
FIG. 4 is a partial, enlarged rear elevational view showing the adjustment retaining means.

As illustrated, the upper back rest 25 is spaced vertically over the lower back rest 20, as by an intervening space 27, see FIGS. 1 and 4; and, the upper back rest is movable generally vertically toward and away from the lower back rest 20 to decrease and increase the space 27. Suitable mounting means, generally designated 30, are provided to afford this relative movement of the upper back rest part 25 toward and away from the lower back rest part 20. In particular, the mounting means 30 may include a generally U-shaped slide member or rod 31 having an intermediate portion 32 extending laterally across an upper region of the upper back rest 25, adjacent to an upper region of the latter, and having a pair of laterally spaced depending legs or arms 33 extending along respective side margins of the upper back rest and depending therefrom to extend along opposite side margins of the lower back rest 20 on the rearward side thereof, as the end portions 34. The slide 31 of mounting means 30 may be anchored to the upper back rest 25, as by anchoring fasteners or straps 35 embracing the upper portions of legs 33 and secured to the upper back rest. Further, a plurality of straps 36 may slidably receive and embrace leg extensions 34, being secured to the lower back rest 20, defining guides or ways for the slide members 34 and thereby mounting the upper back rest 25 for up-and-down movement in a vertical plane away from and toward the lower back rest 20.

A torso girding strap or belt is generally designated 40, and may be fabricated of any suitable flexible strapping or webbing, such as woven nylon, or the like. The belt or strap 40 may have one end region 41 fixedly anchored to one side of the upper back rest 25, as by a permanent loop encircling mounting leg 33 between an adjacent pair of mounting straps 35. Adjacent to the other side of upper back rest 25, there may be provided a pair of releasable interlocking detachable connector elements, as at 42 and 43. More specifically, one connector element 42 may be suitably anchored fast to an adjacent portion of mounting rod or leg 33, and a mating or complementary connector element 43 may be secured to the free end 44 of belt 40, and movable into and out of releasable locking securement with connector element 42. Any suitable belt length adjustment means may be provided, as at 45. The belt or strap 40 is thus adapted to extend snugly about an occupant's torso, for purposes appearing more fully hereinafter.

Releasably retaining the upper back rest 25 in an elevated position spaced over the lower back rest 20, under the gravitational load of an occupant supported, at least in part, by the belt 40, is a releasable retaining mechanism, generally designated 50. In particular, the retaining mechanism 50 may include ratchet and pawl means connected to the upper and lower back rests 25 and 20 to maintain the latter at a selected spacing. The ratchet and pawl means may consist of a pair of generally parallel spaced, vertically extending toothed bars or racks 51 and 52 which may be fixed in their laterally spaced relation to the rear side of the upper back rest 25 and depend therefrom, as at 53 and 54, respectively, along the rear side of lower back rest 20. The depending rack or bar portions 53 and 54 are each provided with generally downwardly facing ratchet teeth, as at 55 and 56, respectively. Thus, the toothed racks or bars 51 and 52 define ratchets carried by the upper back rest 25.

The retaining means 50 further includes pawl means, generally designated 60, in cooperating, releasably retaining interfitting engagement with the ratchet means or racks 51, 52. The pawl means includes a channel-like bracket 61 having its web 62 suitably secured in facing engagement with the rear surface of lower back rest part 20, as by fasteners 63, see FIG. 4. The web 62 may extend beneath or forward of one toothed rack 52, having its side walls or flanges 64 and 65 located on opposite sides of the rack 52. That is, the bracket flange 65 may extend longitudinally of and spaced between the toothed racks 51 and 52, while the bracket flange 64 may be located longitudinally along and outwardly of the adjacent rack 52. A rotary shaft or rod 66 extends rotatably through a journal hole 67 in the bracket flange 64, thence passing inwardly through an elongate slot 68 provided longitudinally in the adjacent toothed rack 52 and provided in the space between racks 51 and 52 with a generally upwardly disposed angulate extension or finger 69. On its upper or distal end, the finger 69 may be provided with a transverse engaging member or cross piece 70 having its opposite ends respectively engageable in intertooth retaining relation with respective rack teeth 55 and 56.

Figure 3:
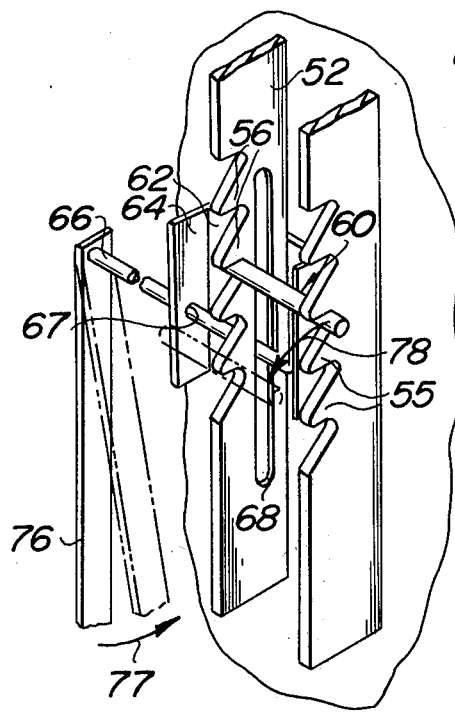
FIG. 3 is an enlarged, partial rear perspective view showing the adjustment retaining means of the chair of FIGS. 1 and 2.

The other, outer end of rotary shaft or rod 66 may be suitably rotatably supported or journaled with respect to the lower back rest 20, as by a strap 75, or other suitable journaling means, and the outer rod end may be provided outboard of the lower back rest 20 with a depending lever arm or crank 76. As best seen in FIG. 3, the lever arm, crank or handle 76 is swingable forwardly, in the direction of arrows 77 to rotate shaft 66, pawl finger 69 and transverse engaging piece 70 in the direction of arrow 78 for withdrawal from retaining intertooth engagement. In this released condition, the upper back rest part 25 may be moved vertically as constrained by its mounting means 30. In this manner, raising or lowering of the upper back rest 25 and its torso girding belt 40 may be effectively accomplished by the occupant, lowering action requiring only disengaging movement of lever 76 in the direction of arrow 77 and raising action requiring such lever movement together with manual raising of the upper back rest 25. With the actuating arm 76 swung counterclockwise, as seen in FIG. 3, and the pawl means 60 released or disengaged, the upper back rest part 25 is freely shiftable vertically within limitations imposed by the ends of slot 68 engaging rod 66. When the pawl means 60 is returned to its retaining engagement, as shown in solid lines in FIG. 3, it will be apparent that a relatively symmetrical distribution of forces is achieved by means of the two laterally spaced racks 51 and 52 engaging opposite ends of the transverse engaging members 70. If desired for heavier duty, additional journal supports may be provided for the shaft 66, say in the flange 65, if desired.

From the foregoing, it will be seen that the present invention provides a chair construction which is uniquely simple in structure and operation, inherently durable and reliable throughout a long useful life, and advantageously serves to provide its occupant with a variety of differently supported body positions for use over a relatively long interval of required seating to avoid or ameliorate the tiring discomfort thereof.

Although the present invention has been described in some detail by way of illustration and example for purposes of clarity of understanding, it is understood that certain changes and modifications may be made within the spirit of the invention.

What is claimed is:

1. A chair construction comprising a seat for supporting gravitational load of a user, a lower back part upstanding from a rear region of said seat, an upper back part generally over said lower back part for engaging the back of a user, mounting means mounting said upper back part for up and down movement in a generally vertical plane away from and toward said seat over said rear region of the latter, a belt carried by said upper back part for snug vertically supporting engagement about a user's torso, and retaining means for releasably retaining said upper back part in a selected position of said up and down movement, whereby a user's torso is adapted to be elevated generally vertically away from while remaining on the seat for lessened pressure on the user's buttocks and increased comfort during long usage.

2. A chair construction according to claim 1, said retaining means comprising ratchet and pawl means on said upper and lower back parts releasably retaining said upper part against falling.

3. A chair construction according to claim 1, said mounting means comprising relatively slidable slide and way means on said upper and lower back parts.

4. A chair construction according to claim 1, said lower back part comprising a lower back rest for engaging the lower back of a user, and said upper back part comprising an upper back rest for engaging the upper back of a user.

5. A chair construction according to claim 4, said belt being detachably extendable across and between opposite sides of said upper back rest.

6. A chair construction according to claim 5, said retaining means comprising ratchet and pawl means on said upper and lower back rests releasably retaining said upper back rest against downward movement.

7. A chair construction according to claim 6, said ratchet and pawl means comprising generally upright toothed rack means fixedly secured to said upper back rest, a pawl swingably carried by said lower back rest for movement into and out of upstanding retaining engagement with said rack means at a selected location therealong, and a lever arm connected to said pawl for swinging the latter out of said retaining engagement.

8. A chair construction according to claim 7, said rack means comprising a pair of laterally spaced toothed racks, and said pawl comprising a swingable finger between said racks, and a cross-piece on said finger having its opposite ends engageable with the teeth of respective racks.

* * * * *